United States Patent [19]

Tiethof

[11] 4,076,795
[45] Feb. 28, 1978

[54] HYDROSULFITE PRODUCTION

[75] Inventor: Jack A. Tiethof, South Plainfield, N.J.

[73] Assignee: Engelhard Minerals & Chemicals Corporation, Edison, N.J.

[21] Appl. No.: 721,875

[22] Filed: Sep. 9, 1976

[51] Int. Cl.² .............................................. C01B 17/66
[52] U.S. Cl. .................................... 423/515; 423/140; 8/110; 252/188
[58] Field of Search ............... 423/515, 140; 252/188; 8/110

[56] References Cited

U.S. PATENT DOCUMENTS

| 791,675 | 6/1905 | Descamps | 423/515 |
|---|---|---|---|
| 961,391 | 6/1910 | Weindel | 423/515 |
| 2,226,576 | 12/1940 | Park et al. | 423/515 |
| 3,804,944 | 4/1974 | Kise et al. | 423/515 X |

OTHER PUBLICATIONS

Murray et al., "Pulp and Paper Mag. of Canada" 68, 1967.

*Primary Examiner*—Jack Cooper
*Attorney, Agent, or Firm*—Inez L. Moselle

[57] ABSTRACT

An improved method for producing iron hydrosulfite liquor by reduction of sulfur dioxide with metallic iron is disclosed. Also disclosed are improvements in the conversion of the iron hydrosulfite liquor to produce sodium hydrosulfite bleach liquors.

13 Claims, No Drawings

HYDROSULFITE PRODUCTION

BACKGROUND OF THE INVENTION

1. Field of the Invention

The invention relates generally to the art of reducing sulfur dioxide with a metal in the presence of water to form a metal hydrosulfite salt solution. In particular, the invention relates to the use of iron metal to reduce sulfur dioxide in aqueous medium to produce an iron hydrosulfite liquor and also to the conversion of the iron hydrosulfite liquor to a sodium hydrosulfite bleach liquor.

2. Prior Art

Hydrosulfite (dithionite) salts are widely used commercially as reducing and bleaching agents. Clay, textile and pulp manufacturers are principal users. Considerable prior art is directed to the production of hydrosulfite salts by reducing sulfur dioxide or bisulfites with a metal. Of the metals that have been suggested, powdered zinc is the only one that has enjoyed widespread commercial use. Zinc hydrosulfite liquors have been produced commercially for many years but they now have limited utility because zinc is expensive and, furthermore, it is now recognized that zinc is a water stream pollutant which is toxic to marine life. Processes for converting zinc hydrosulfite liquors to sodium hydrosulfite are well known but the process is costly. Sodium hydrosulfite liquors can be produced without intermediate formation of zinc hydrosulfite by using sodium in the form of a mercury amalgam as the reductant but this method requires an inexpensive source of sodium amalgam such as a chloro-alkali plant would provide. Anhydrous solid sodium hydrosulfite is produced commercially by reaction of sulfur dioxide with formates in organic solvents.

It has long been known that iron can be reacted with sulfur dioxide in the presence of water to produce a hydrosulfite salt. In fact, it is understood that iron hydrosulfite was the first hydrosulfite salt that was ever prepared. Iron is included in lists of metals capable of reducing sulfurous acid in several early patents; for example, U.S. Pat. No. 791,675 to Descamps (1905). The metals disclosed in this patent include "zinc, iron, tin and the like." British Pat. No. 181,132 to Stubbs (1922) mentions platinum, iron and zinc. U.S. Pat. No. 1,472,828 to Eustis (1923) discloses "zinc or other metallic dust." Platinum, iron and zinc are mentioned in the disclosure of prior art in U.S. Pat. No. 2,149,506 to Bump (1939). In all of these patents, zinc in the form of a dust is preferred. Iron is mentioned only fleetingly and the patents fail to disclose or suggest reaction conditions that could be used with iron as the reductant. The only detailed report dealing with the preparation of iron hydrosulfite of which I am aware is in a publication of Murray et al. "THE BRIGHTENING OF GROUND-WOOD PULP WITH CALCIUM DITHIONITE," PULP AND PAPER MAG. CAN. 68, T-28, January 1967. Recognizing the abundance of the lost cost of iron as well as the limited nature of the information in the literature concerning the use of iron to form hydrosulfites, the authors reported that iron hydrosulfite could be produced from iron powder and sulfur dioxide at low temperature but the yields reported were far from quantitative.

It has also been suggested in the prior art to employ bases to precipitate metal hydroxides from metal hydrosulfite liquors and produce other hydrosulfites. For example, Descamps suggested calcium, sodium and barium bases for use with metal hydrosulfites, especially zinc. Eustis disclosed caustic soda. U.S. Pat. No. 2,172,275 to Dehnert (1939) reacted aqueous solutions of heavy metal hyposulfites (sic) of which he included salts of zinc, cadmium and iron, preferably zinc, with an alkali metal amalgam to produce a solution of sodium hyposulfite (probably hydrosulfite). Murray et al. describe in limited detail the conversion of their iron dithionite liquor to a calcium dithionite liquor by reaction with calcium hydroxide followed by filtration to remove the precipitate of ferrous hydroxide and by-product calcium sulfite. Murry et al. proposed the use of sodium hydroxide to precipitate the iron but no experimental work is described in their publication.

To the best of my knowledge iron has never been used on a commercial basis to produce hydrosulfite liquors in competition with zinc hydrosulfite bleach liquors or dry sodium hydrosulfites produced by various technologies. The prior art as set forth by Murry et al. reveals many problems which would preclude use of iron to produce hydrosulfite liquors of commercial utility. At the outset, very fine iron powders were needed to produce iron hydrosulfite in yields greater than 70%. For example, the best yield reported (75%) was achieved with 450–500 mesh iron powders. Using iron powder as fine as 250 mesh, yield was only about 65%. Such powders, especially the 500 mesh powder, are quite costly. Furthermore, very concentrated sulfur dioxide solutions (in excess of 15%) were necessary to achieve yields in excess of 70% even when using the 500 mesh iron powder. Large excesses of sulfur dioxide were apparently used (as evidenced by the relatively constant low pH values during reduction). Since the reaction had to be carried out at temperatures below 5° C. for high yields, problems such as achieving effective cooling of the solution during reduction would be encountered. Finally, the prior art technique for removing soluble iron from the iron hydrosulfite liquors with lime led to significant losses in hydrosulfite yield. For example, when iron hydrosulfite was prepared with a 75% yield, use of lime to precipitate iron led to recovered yields of calcium dithionite liquor of only 50% at best. While Murray et al. suggested that sodium hydroxide could be used as a precipitant, I found that significant losses in yield of hydrosulfite liquor are generally encountered when using sodium hydroxide to convert iron hydrosulfite to the sodium salt.

Accordingly, an object of my invention is to provide a process for producing iron hydrosulfite liquor in high yields (for example, 70 to 80% based on the iron used) in which relatively coarse, inexpensive commercial iron powders can be used. Another objective is to provide a technology for converting such iron hydrosulfite liquors into sodium hydrosulfite liquors useful for bleaching. In particular, an object is to produce sodium hydrosulfite at high recovered yields, for example about 70% recovery, for a liquor in which essentially all of the iron has been removed.

THE INVENTION

The essence of my invention, briefly stated, comprises adding a small predetermined quantity of a base to an aqueous solution of sulfur dioxide soluble before contacting the solution with metallic iron, reacting the iron with the sulfur dioxide at low temperature to form iron dithionite liquor, and immediately thereafter adding additional base, preferably sodium hydroxide or sodium carbonate, to the solution of the iron hydrosulfite to increase the pH to a value sufficiently high to retard the decomposition of the liquor thus formed and assure a high yield. The stabilized iron hydrosulfite liquor may then be converted into another hydrosulfite more useful in bleaching, such as the sodium or calcium salt. Known means to effect the conversion can be used. In an especially preferred embodiment, the stabilized iron hydrosulfite liquor is converted into a sodium hydrosulfite bleach liquor by addition of a base that is weaker than sodium hydroxide, such as sodium carbonate or sodium silicate, to precipitate iron, the addition of the precipitant being carried out at temperature below ambient and under a nonoxidizing atmosphere. Thereafter the precipitate is separated by means such as filtration from the liquor, which is a solution of sodium hydrosulfite. Such separation is carried out under a nonoxidizing atmosphere. Preferably the precipitate is washed to recover additional sodium hydrosulfite liquor that adheres to the separated precipitate.

DESCRIPTION OF PREFERRED EMBODIMENTS

In putting the present invention into practice, iron powder is added to a cold aqueous sulfur dioxide solution under an inert atmosphere. The mixture is stirred at a rate to keep the iron particles moving continuously throughout the solution and for a period of one to several minutes. During this time, the iron dissolves, reacting with sulfur dioxide and producing heat. A cooling bath is applied to dissipate this heat and to cool the slurry to a temperature in the range of $-3°$ to $15°$ C. After the metal reduction step, an aqueous solution of sodium hydroxide is added to raise the pH and to precipitate the soluble iron. The iron precipitate, mostly ferrous hydroxide, can then be separated by filtration, followed by a water wash. The two steps are summarized by the equations:

$$Fe + 2 SO_2 \rightarrow FeS_2O_4 \qquad \text{Step 1}$$

$$FeS_2O_4 + 2 NaOH \rightarrow Na_2S_2O_4 + Fe(OH)_2 \qquad \text{Step 2}$$

Solutions with $SO_2$ concentrations as high as 16% have been used with outstanding results. However, 8% $SO_2$ solutions also gave rise to superior yields of iron hydrosulfite. Even solutions of 4% $SO_2$ give yields only slightly lower than with 8% solutions. Preferably solutions of lower concentration are employed because they can be more effectively cooled than solutions of high concentration.

As mentioned, an essential feature of the invention resides in the addition of a predetermined amount of base to the sulfur dioxide solution before iron reduction takes place (Step 1). When it is desired to produce sodium hydrosulfite liquors (Step 2), a sodium base such as sodium carbonate or hydroxide is used as in Step 1. Addition of the small amount of base before carrying out Step 1 results in improved yields of iron hydrosulfite liquor as compared with yields obtained when no base is added provided an excessive amount of base is not added. Generally from about 0.05 to less than 0.3 equivalents of base per mole $SO_2$ are used. The optimum proportion of base may vary inter alia with the ratio of sulfur dioxide and iron that are employed. When reacting sulfur dioxide and iron in approximately stoichiometric proportions, the use of from about 0.1 to 0.2 equivalents NaOH (or $Na_2CO_3$) per mole $SO_2$ is recommended since yields of iron hydrosulfite were found to be at a maximum. I found that the use of less than 0.1 mole NaOH per mole $SO_2$ resulted in an increase in yield as compared to the yield obtained without any addition of a base. However, when appreciably more than 0.3 equivalents of NaOH was incorporated before iron reduction using approximate equivalents of iron and sulfur dioxide, the yield of iron hydrosulfite was even less than it was when no base was added. A plausible explanation is that the pH of the reaction medium was too high for all the iron to react when an excessive amount of base is added.

The relative amounts of $SO_2$ to Fe to be used can be varied significant from the 2/1 theoretical ratio. It is usually suitable with commercial powder to run the reduction using the theoretical ratio or with iron or $SO_2$ in slight excess. A particularly suitable arrangement is to have $SO_2$ in a slight excess, for example an excess of 5 to 10% (mole basis).

Another feature of this invention, which is important from an economic view, is that very fine particle iron powder is not required. It is noted that the prior art (Murray et al. publication, supra) required the use of extremely fine powdered iron, identified as being in the mesh-size range of 450 to 500, in order to obtain yields of iron hydrosulfite in excess of 70%.

In practice of my invention the iron powder may be composed of particles substantially all of which are 325 mesh (Tyler) or larger. For example, it was found that under the conditions used to practice the invention, commercial grade 100 mesh (Tyler) powder (average mesh size 200) gave as high a yield as 200 mesh commercial grade powder (average mesh size greater than 325 mesh). Yields in excess of 70% were routinely achieved using both 100 and 200 mesh grades of iron powder. The use of 100 mesh iron instead of 200 mesh iron or finer will result in a significant cost saving. It was found that 40 mesh commercial powder (average mesh between 60 and 100) was not quite as suitable as the 100 mesh iron since yields were reduced about 10% when the 40 mesh powder was employed under the same conditions. However, even with the coarser powder, beneficial results were obtained by practice of the principles of the invention. Thus, it is within the scope of my invention to use coarse iron powder, for example powder 40 mesh or even coarser.

The degree of mixing of the particulate iron with the sulfur dioxide solution is important because their heterogeneous reaction must proceed in a relatively short time. It is suitable to mix the slurry at a rate that produces a continuous suspension of all of the iron particles. Cooling is important because the metal reduction is exothermic, and the hydrosulfite at ambient temperatures will decompose rapidly under the low pH conditions of the iron reduction. Cooling the slurry to temperatures in the range of $-3°$ to $5°$ C. is particularly suitable. The metal reduction should usually be performed over a short period, for example from about 1 to 6 minutes. The optimum time depends on reaction conditions (most importantly the particle size of the iron, the temperature of the reduction and the pH of the system near the end of the reduction).

The caustic is added in two stages to produce the iron hydrosulfite liquor. Sodium hydroxide is the preferred base although potassium hydroxide or other bases can be used. As mentioned, the first portion is added to the sulfur dioxide solution before Step 1. This generally results in a pH of about 1. After reduction is complete, pH is usually about 3 when using approximately stoichiometric quantities of iron and sulfur dioxide. When an excess of iron is employed, pH may be higher. Another portion of the caustic is added immediately after the iron reduction, the amount added at this point is generally sufficient to raise the pH to about 4.5 or higher. This reduces the rate of hydrosulfite decomposition to permit handling of the iron hydrosulfite liquor. Addition of base in the second stage can be to the point of incipient precipitation.

Normally at least a portion of the iron in the iron hydrosulfite liquor should be removed by precipitating the iron as an insoluble ferrous compound and removing the precipitate before using the liquor for bleaching. For example, when used to bleach kaolin clay, the amount of iron removal necessary during bleach liquor precipitation will depend on the pH used during bleaching. When bleaching at relatively high pH (e.g., 3.3 to 3.5), essentially all of the iron (90% or greater) is preferably precipitated from the iron hydrosulfite liquor. In the case of a 6% $Na_2S_2O_4$ liquor, an iron concentration of 1000 to 2000 p.p.m. has no detrimental effect when bleaching at relatively high pH value. When bleaching at low pH (e.g., pH 2.8 to 2.9) the requirement for iron removal is not so stringent although most of the iron must still be removed.

The requisite amount of soluble iron can be readily precipitated using sodium hydroxide. In effect this would constitute a third stage of caustic addition. Alternatively, a sodium alloy or amalgam could be used, producing caustic in situ. Preferably bases other than sodium hydroxide are employed to effect at least a portion or iron removal. It has been discovered that use of weaker bases than sodium hydroxide, especially water-soluble sodium silicates, for example sodium silicate of the formula $Na_2O.xSiO_2$ wherein $x$ is 1 to 2, and sodium carbonate resulted in precipitates which retained less of the bleach liquor than were retained using sodium hydroxide as the base. For example, when about 50% of Fe was precipitated with sodium hydroxide, I found that losses of hydrosulfite were minimal. When 91 to 98% was precipitated by using additional sodium hydroxide, losses were in the range of 15 to 25%. However, when I precipitated about half the soluble iron with sodium hydroxide and then precipitated additional iron using weak bases such as sodium monosilicate, sodium disilicate and sodium carbonate, losses were reduced significantly. Thus, using sodium monosilicate, losses were 9% and less when about 96% of the iron was precipitated. Although sodium carbonate can be used to produce a suitable bleach liquor, it will not quantitatively remove all of the soluble iron. Therefore sodium carbonate is used to precipitate iron in those cases in which removal of substantially all (i.e., much greater than 90%) of the soluble iron is not necessary. The prior art reports losses of about 33% when using lime as a precipitant. I found that losses exceeded this value when lime was employed to precipitate iron from hydrosulfite liquors (under conditions which resulted in minimal losses when employing sodium silicate).

Irrespective of the base used in the third stage, it is preferable when precipitating iron to add the base relatively slowly with only a small amount of mixing. This produces a precipitate that is more readily separated than if a more rapid precipitation is performed. The temperature during the precipitation is not as critical as in Step 1 although temperature is preferably controlled below ambient (in the range of 10° to 20° C.) to minimize decomposition.

The separation of the precipitate can be performed using pressure filtration with the aid of an inert gas such as nitrogen. This is followed with a moderate amount of water wash. The resulting sodium hydrosulfite liquors typically have pH values in the range of about 7 to 10.

The liquors produced with 90 to 99% iron removal were found to be equivalent to commercial sodium hydrosulfite (based on $Na_2S_2O_4$ content) in the bleaching of Georgia kaolin.

All of the results achieved by practice of my invention as described hereinabove and set forth in the accompanying illustrative examples are based on analyses of hydrosulfite by titration with potassium ferricyanide. The ferricyanide tests were performed by titrating liquors directly into solutions of $K_3Fe(CN)_6$ (as a 3 to 6% solution in degassed water). The end point is a color change from orange to colorless or pale yellow. This titration involves the reaction of 2 moles of ferricyanide per mole $S_2O_4^=$. Using this analytical technique it was found that by-products such as $S_2O_3^=$ did not interfere as it does when carrying out the standard iodine method (TAPPI Standard Procedure No. T-622 OS-68). Furthermore, $Fe^{+2}$ interferes in the standard method while it does not interfere with the ferricyanide method. In fact, using the ferricyanide test method, $Fe^{+2}$ produces a more sensitive end point color change (blue-green to colorless or pale yellow) than is obtained when $Fe^{+2}$ is not present.

As a practical test of the reliability of the ferricyanide analytical procedure, bleaching tests were carried out to determine whether the hydrosulfite liquors of the invention would bleach a given weight of clay to the same brightness level that was obtained when bleaching with equivalent amounts of a freshly prepared solution of commercial solid hydrosulfite. The analysis of the solution of commercial sodium hydrosulfite was performed by the standard iodine method while the liquors produced by iron reduction were analyzed with potassium ferricyanide. By comparing the bleach level in weight of sodium hydrosulfite per weight of clay bleached against the brightness that was obtained, it was found that the ferricyanide test was a reliable method for analyzing for hydrosulfite.

The invention will be further described with reference to the following experimental work.

EXAMPLE I

This example illustrates a presently preferred procedure for producing iron hydrosulfite liquor.

The metal reduction was performed in a 1 liter, five-neck round bottom flask. Mixing was accomplished with a Teflon paddle stirrer fitted to a ground glass bearing stirrer in the center neck. In one of the side necks was a two-hole rubber stopper containing a pH electrode and a thermocouple. In another neck was placed a 125 ml. addition funnel containing a sodium hydroxide solution of 25% concentration. The other two necks were fitted with a stopper and a gas inlet which was connected to a vacuum-nitrogen manifold. The flask was filled with nitrogen, using the vacuum-nitrogen gas manifold. The electrode was placed in the flask at this point. A cold $SO_2$ solution (34.1 g. in 395 g. water) was added by syringe with the flask under a positive nitrogen pressure. The solution was cooled to near its freezing point using a slush bath of dry ice and isopropanol. Next 10 ml. of caustic solution was added (3.2 g. NaOH), and the solution was recooled to the freezing point. Under a positive nitrogen pressure, commercial 100 mesh iron powder (13.5 g.) was added through a long stem funnel into the previously stoppered neck. The stopper was returned and the mixture was stirred at a rate of 300 r.p.m. for 4 minutes. Although the flask was in constant contact with the slush bath, the temperature rose to 5° C. during the first 30 seconds and then gradually decreased during the next 2 minutes to near the freezing point ($-2°$ C.). This temperature was maintained for the remaining 2 minutes with intermittent cooling. After the 4 minute reduction, an additional 5 ml. of caustic solution was added which raised with pH to 5. This caused just a trace of black precipitate to form. The iron hydrosulfite liquor was analyzed for hydrosulfite content. Potassium ferricyanide (2.000 g.) was placed in a flask flushed with nitrogen, and 30 ml. of degassed water was added to dissolve the solid. The liquor was added by syringe below the surface of the ferricyanide solution causing the orange color to turn blue-green. The addition was continued until the dark color disappeared. The yield based on this analysis was calculated to be 74 and 67%, based on Fe and $SO_2$, respectively.

EXAMPLE II

To demonstrate the desirable effect of adding a controlled amount of sodium hydroxide to the sulfur dioxide solution before iron reduction on the yield of iron hydrosulfite, Example I was repeated except that no caustic was added before iron reduction. To stabilize the iron hydrosulfite liquor thus obtained, a 25% sodium hydroxide solution was added to the point of incipient precipitation (pH of about 4.5). The yield of iron hydrosulfite was 65% and 59% based on Fe and $SO_2$, respectively. In contrast, yields were 74% and 67% based on Fe and $SO_2$ respectively when caustic was added before iron reduction in accordance with the invention.

EXAMPLE III

Following is an example of a preferred method for producing a $Na_2S_2O_4$ liquor containing minimal soluble iron. The procedure used was identical to Example I with the following exceptions: first, 20 ml. of caustic solution (instead of 5 ml.) was added during the 15 seconds after the reduction step to precipitate partially soluble iron. Thereafter 31 ml. of sodium silicate solution (15.6 g. $Na_2O.SiO_2$) was added with slow stirring to precipitate the remaining soluble ferrous iron. After precipitation was complete the pH was 7.4. The slurry was then transferred with a hose pump through Tygon tubing to an inert atmosphere filter (volume 600 ml., filter diameter 6.4 cm.). The liquor was filtered into a three-neck flask (flushed with nitrogen) with the assistance of a nitrogen pressure of approximately 30 p.s.i. Two portions of degassed water were added to wash the reactor and then the filter cake. The resulting liquor (liquor plus wash) weighed 584 g. and was analyzed to contain 29.1 g. of $Na_2S_2O_4$ (this corresponds to yields of 68% and 62%, based on Fe and $SO_2$, respectively). The liquor contained 920 p.p.m. of $Fe^{+2}$ (this corresponds to 96% removal of iron).

EXAMPLE IV

This example illustrates the effect of pH on the reduction of sulfur dioxide by iron to form iron hydrosulfite and the production of a sodium hydrosulfite bleach liquor therefrom.

The published literature on iron reduction (Murray et al., supra) indicates that highly acidic sulfur dioxide solutions are necessary for superior yields and that a pH of about 0.75 (the pH of a saturated solution) was optimum. A reasonable rationale for this is twofold: side reaction of hydrogen evolution would be loss competitive under very acidic conditions; and acidic conditions are thermodynamically favorable for the formation of a hydrosulfite from iron and sulfur dioxide.

It was found that it was necessary to carry out the reduction using highly acidic solutions of sulfur dioxide, but contrary to the teachings of the prior art it was found that the best yields were obtained by adding a small amount of base to increase slightly the pH of the sulfur dioxide solution. However, the amount added had to be strictly controlled. This was shown in experiments in which sodium hydroxide was added to the solutions of sulfur dioxide in amounts of 0.16, 0.31, 0.47 and 0.70 moles per mole $SO_2$ before reducing the $SO_2$ with iron, using a 5% excess of $SO_2$ over Fe.

It was found that when more than 30% of the theoretical NaOH (about 0.3 mole/mole $SO_2$) was used, yields were less than when no caustic was added before reduction. From the pH profile of the slurry for the large amounts of caustic it was noted that the pH of the slurries rose during reduction to too high a value for iron to react spontaneously with sulfur dioxide. In fact, appreciable amounts of unreacted iron were visible when 47 to 70% of the theoretical sodium hydroxide was added before iron reduction. In contrast, when 16% of the theoretical sodium hydroxide was used (about 0.16 moles/mole $SO_2$), yields were significantly higher than when no caustic was added before reduction. It is not understood why caustic added in limited amounts prior to reduction gave better yields than when no caustic was added. A possible explanation is that the addition of caustic raises the pH profile sufficiently during reduction to retard hydrosulfite decomposition.

Resort may be had to such variations and modifications as fall within the spirit of the invention and the scope of the appended claims.

I claim:

1. In a process for producing iron hydrosulfite liquor by reacting particulate metallic iron with a strongly acidic aqueous solution of sulfur dioxide at a low temperature, the improvement which comprises: adding a base selected from the group consisting of sodium hydroxide and sodium carbonate to said aqueous solution of sulfur dioxide in amount within the range of about 0.05 to less than 0.3 equivalent of said base per mole $SO_2$ before contacting the solution of sulfur dioxide with said iron, reacting said iron with said solution of sulfur dioxide containing said base at $-3°$ to 15° C. to form iron hydrosulfite liquor and thereafter immediately adding a base selected from the group consisting of sodium hydroxide and sodium carbonate to said iron hydrosulfite liquor to increase the pH to a value at which decomposition is significantly retarded, thereby producing stabilized iron hydrosulfite liquor.

2. The process of claim 1 including the subsequent steps of adding to said stabilized iron hydrosulfite liquor an iron precipitant selected from the group consisting of sodium hydroxide, sodium carbonate and, sodium silicate, while controlling the temperature below ambient, sufficient precipitant being added to precipitate most of the iron, and separating the resulting iron-containing precipitate from the remaining liquor.

3. The process of claim 2 wherein the separation of said precipitate is carried out by filtration under pressure and under an atmosphere of nitrogen.

4. The process of claim 1 wherein sodium hydroxide is added to said solution of sulfur dioxide before said solution of sulfur dioxide is contacted with said iron, said sodium hydroxide being added in amount within the range of about 0.1 to 0.2 equivalents per mole $SO_2$.

5. The process of claim 1 wherein sodium hydroxide is added to said iron hydrosulfite liquor in amount sufficient to increase the pH to at least about 4.5 and produce said stabilized iron hydrosulfite liquor.

6. The process of claim 5 including the additional steps of adding sodium hydroxide to said stabilized iron hydrosulfite liquor to precipitate iron therein and to convert said liquor to sodium hydrosulfite, separating the resulting precipitate from said sodium hydrosulfite liquor, and recovering said sodium hydrosulfite liquor.

7. The process of claim 6 wherein the sodium hydrosulfite liquor that is recovered has a pH in the range of 7 to 10.

8. The process of claim 5 including the additional steps of adding sufficient sodium hydroxide to said stabilized iron hydrosulfite liquor to precipitate about half of the iron and then adding a weak base selected from the group consisting of sodium silicate and sodium carbonate to remove most of the remaining iron and form sodium hydrosulfite liquor, separating the precipitate from said sodium hydrosulfite liquor, and recovering said sodium hydrosulfite liquor.

9. The process of claim 7 wherein the sodium hydrosulfite liquor that is recovered has a pH in the range of 7 to 10.

10. The process of claim 1 wherein the iron is in the form of particles substantially all of which are larger than 325 mesh.

11. The process of claim 1 wherein the iron is in the form of a commercial 100 mesh powder having an average mesh size of about 200.

12. A process for producing sodium hydrosulfite bleach liquor which comprises providing an aqueous solution of sulfur dioxide having a concentration in the range of about 4% to 16% on a weight basis, adding to said solution sodium hydroxide in amount in the range of about 0.05 to less than 0.3 equivalent NaOH per mole $SO_2$, contacting the resulting solution with particles of metallic iron substantially all of which are larger than 325 mesh under conditions of agitation sufficient to maintain said iron particles suspended in said solution at a temperature in the range of about $-3°$ to $5°$ C. for a period in the range of about 1 to 6 minutes and sufficient for iron hydrosulfite to form, immediately thereafter increasing the pH of the iron hydrosulfite solution to a value of at least about 4.5 by addition with agitation of sodium hydroxide, thereby forming a stabilized iron hydrosulfite liquor, precipitating about half the iron in said stabilized iron hydrosulfite liquor by adding sodium hydroxide and then precipitating most of the remaining iron by addition of a basic alkali metal compound that is a weaker base then sodium hydroxide, separating the iron-containing precipitate from the resulting sodium hydrosulfite liquor under a nonoxidizing atmosphere by filtration under pressure, recovering said sodium hydrosulfite liquor and washing the resulting filter cake to remove and recover additional sodium hydrosulfite liquor that has adhered to the filter cake.

13. A process for producing sodium hydrosulfite bleach liquor which comprises providing an aqueous solution of sulfur dioxide having a concentration in the range of about 4 to 16% on a weight basis, adding to said solution sodium hydroxide in amount in the range of about 0.05 to less than 0.3 equivalent NaOH per mole $SO_2$, contacting the resulting solution with particles of metallic iron substantially all of which are larger than 325 mesh under conditions of agitation sufficient to maintain said iron particles suspended in said solution at a temperature in the range of about $-3°$ to $5°$ C. for a period in the range of about 1 to 6 minutes and sufficient for iron hydrosulfite to form, immediately thereafter increasing the pH of the iron hydrosulfite solution to a value of at least about 4.5 by addition with agitation of sodium hydroxide, thereby forming a stabilized iron hydrosulfite liquor, precipitating sufficient iron in said stabilized iron hydrosulfite liquor at a temperature in the range of about 10° to 20° C. by adding sodium hydroxide in amount sufficient to produce a sodium hydrosulfite liquor containing no more than 2000 p.p.m. iron, separating the iron-containing precipitate from said sodium hydrosulfite liquor under a nonoxidizing atmosphere by filtration under pressure, recovering said sodium hydrosulfite liquor and washing the resulting filter cake to remove and recover additional sodium hydrosulfite liquor that has adhered to the filter cake.

* * * * *